United States Patent
Chen et al.

(10) Patent No.: US 7,787,081 B2
(45) Date of Patent: Aug. 31, 2010

(54) PHOTO-SENSITIVE ELEMENT AND LIQUID CRYSTAL DISPLAY WITH THE SAME

(75) Inventors: Po-Yang Chen, Tao-Yuan Hsien (TW); Po-Sheng Shih, Tao-Yuan Hsien (TW); Tsu-Chiang Chang, Tao-Yuan Hsien (TW)

(73) Assignee: Hannstar Display Corporation, Yang-Mei, Tao-Yuan Hsien (TW)

( * ) Notice: Subject to any disclaimer, the term of this patent is extended or adjusted under 35 U.S.C. 154(b) by 928 days.

(21) Appl. No.: 11/611,320

(22) Filed: Dec. 15, 2006

(65) Prior Publication Data

US 2008/0143942 A1 Jun. 19, 2008

(51) Int. Cl.
*G02F 1/133* (2006.01)
(52) U.S. Cl. .......................................... 349/116; 349/12
(58) Field of Classification Search ........................ None
See application file for complete search history.

(56) References Cited

U.S. PATENT DOCUMENTS

| | | | |
|---|---|---|---|
| 6,831,710 B2 | 12/2004 | den Boer | |
| 7,525,523 B2 * | 4/2009 | Yamazaki et al. | 345/81 |
| 2003/0179323 A1 | 9/2003 | Abileah et al. | |
| 2005/0082968 A1 | 4/2005 | Choi et al. | |
| 2005/0093851 A1 | 5/2005 | Nakamura et al. | |
| 2005/0134751 A1 * | 6/2005 | Abileah et al. | 349/42 |

FOREIGN PATENT DOCUMENTS

JP 2005-196737 7/2005

OTHER PUBLICATIONS

English language translation of abstract of JP 2005-196737.

* cited by examiner

*Primary Examiner*—David Nelms
*Assistant Examiner*—Lucy P Chien
(74) *Attorney, Agent, or Firm*—Thomas, Kayden, Horstemeyer & Risley, LLP

(57) ABSTRACT

A photo-sensitive element, a readout pixel with the photo-sensitive element, and a liquid crystal display with the readout pixels are described. The photo-sensitive element includes a switch TFT and a photo detecting device. The hate electrode of the switch TFT is electrically connected to a switch line and the source electrode of the switch TFT is electrically connected to a readout line. The photo detecting device is connected between the switch line and the drain electrode of the switch TFT for detecting the brightness of a light incident thereon. The photo detecting device is preferably a photo TFT, a photo diode, or a light sensitive resistor. The photo TFT and the switch TFT are preferably amorphous silicon transistors. The switch line is preferably a gate line disposed on the TFT array substrate of the crystal display.

21 Claims, 6 Drawing Sheets

PHOTO-SENSITIVE ELEMENT AND LIQUID CRYSTAL DISPLAY WITH THE SAME

FIELD OF THE INVENTION

The present invention generally relates to a photo-sensitive element. More particularly, the present invention relates to a photo-sensitive element having a detecting function and a liquid crystal display with the same.

BACKGROUND OF THE INVENTION

Normally, a touch panel with a transparent surface is mounted on a display device, such as the liquid crystal display of a notebook computer or a personal digital assistant (PDA), which serves as an input device or an input interface by a user without an additional keyboard or mouse. The touch panel has been used for a graphic process such as CAD. The touch panel is referred to as a touch film, a touch screen, a digitizer, a tablet or an electric graphic input panel (EGIP).

Depending upon the sensing method of a touch panel when a user touches its surface, touch panels are usually classified as either a resistive type, a capacitive type, or an electromagnetic type. In the resistive type touch panel, a current change is detected according to the position of a touching point by applying a DC voltage. Meanwhile, in the capacitive type touch panel, the position of a touching point is detected by a capacitance coupling with applying an AC voltage. Also, in the electromagnetic type touch panel, the position of a touching point is detected by detecting a resonant frequency resonated as an induction voltage by applying an electromagnetic field.

The respective type touch panels have different signal-amplifications, resolutions, designs and processing technology characteristics, so that the touch panel type is selected according to the desired use of the display device using the touch panel and by considering the economical efficiency, endurance and electro-optics, electrical, mechanical, environment-resisting, and input characteristics.

However, touch panels with a transparent surface mounted between the user and the viewing surface of a display, such as a liquid crystal display, have several drawbacks. For example, the transparent surface, together with other layers between the liquid crystal material may result in multiple reflections which decreases the contrast of the display and produces glare. Moreover, externally adding a touch panel to the display increases the manufacturing expense of the display and increases the complexity of the display. Therefore, some of the liquid crystal displays use and combine photo-sensitive elements on the TFT array substrate of the liquid crystal display instead of employing a touch panel mounted on the top surface of the liquid crystal display so that the assembly process of the liquid crystal display with a touch function is simplified.

Referring to FIG. 1A, a current type photo-sensitive element 100 includes a photo thin film transistor 110 (photo TFT) and a switch thin film transistor 130 (switch TFT). The switch TFT 130 electrically connects to the readout line 140 with the source electrode 136 thereof and the switch line 150 with the gate electrode 132 thereof. The drain electrode 134 thereof electrically connects to the source electrode 116 of the photo TFT 110. In addition, the gate electrode 112 and the drain electrode 114 both electrically connect to a bias voltage line 120. The bias voltage line 120 provides a voltage to the photo TFT 110 so that the photo current of the photo TFT 110 is adjusted by the brightness sensed by the photo TFT 110 while the switch TFT is turned on. Normally, the photo current is proportional to the brightness sensed by the photo TFT 110. However, there are so many metal lines, such as the readout line 140, the switch line 150 and the bias line 120, are formed in the TFT array substrate so that the aperture ratio of the liquid crystal display is reduced.

The current type photo-sensitive element 100 has to connect to at least three metal lines, such as the switch line, bias line and readout line, for driving the photo-sensitive element 100 to measure the brightness thereon. Thus, the current type photo-sensitive element is also referred to a three-terminal type element. Referring to FIG. 1B, a charge type photo-sensitive element 800 is described. The photo-sensitive element 800 includes a photo thin film transistor 850 (photo TFT), a switch thin film transistor 840 (switch TFT), and a capacitor 860. The switch TFT 840 electrically connects to the readout line 810 with the source electrode thereof and the switch line 820 with the gate electrode thereof. The drain electrode thereof electrically connects to the source electrode of the photo TFT 850. In addition, the gate electrode and the drain electrode of the photo TFT 850 both electrically connect to a bias voltage line 830. It is noted that the discharge type photo sensitive element is also referred to a three-terminal type element and differing from the current type photo sensitive element 100, the charge type photo-sensitive element 800 has a additional element, the capacitor 860.

With the same manner, the charge type photo-sensitive element 800 also has to connect to at least three metal lines, such as the switch line, bias line and readout line, for driving the photo-sensitive element 800 to measure the brightness thereon.

Therefore, the liquid crystal display combining photo-sensitive elements on the TFT array substrate results in more metal lines in the liquid crystal display reducing the aperture ratio thereof. Accordingly, there is a need to provide a high sensitive touch panel in the liquid crystal display but not to significantly reduce aperture ratio thereof.

SUMMARY OF THE INVENTION

It is an objective of the present invention to provide a liquid crystal display with photo-sensitive elements on the thin film transistor array substrate.

It is another objective of the present invention to provide photo-sensitive elements formed on the thin film transistor array substrate with less metal lines thereon so as to not significantly reduce aperture ratio of a liquid crystal display.

It is further another objective of the present invention to provide photo-sensitive elements formed on a thin film transistor array substrate with higher sensitivity on the brightness variation.

It is yet another objective of the present invention to provide a photo-sensitive element having a high photo sensitivity and a structure of two terminal points.

To accomplish the above objectives, the present invention provides a photo-sensitive element including a first conductive line, a second conductive line, a switch thin film transistor (switch TFT) and a photo detecting device. The switch TFT includes a first gate electrode, a first terminal electrode and a second terminal electrode. The first gate electrode is electrically connected to the first conductive line and the first terminal electrode is electrically connected to the second conductive line. In addition, the photo detecting device is electrically connected between the first conductive line and the second terminal electrode to detect a light incident thereon.

For example, the first gate electrode of the switch TFT is electrically connected to a switch line, the first conductive line, disposed on a thin film transistor array substrate of a liquid crystal display and the source electrode, one of the terminal electrodes, of the switch TFT is electrically connected to a readout line, the second conductive line. The photo detecting device is connected between the switch line and the drain electrode, another one of terminal electrodes, of the switch TFT for detecting the brightness of a light incident thereon. The photo detecting device is a photo thin film transistor (photo TFT), a photo diode, or a light sensitive resistor. In one embodiment, the photo detecting device is a photo TFT, the gate electrode and drain electrode of the photo TFT are electrically connected to the switch line, and the source electrode of the photo TFT is electrically connected to the drain electrode of the switch TFT. In another embodiment, the gate electrode of the photo TFT is electrically connected to the switch line, the drain electrode of the photo TFT is electrically connected to a common line disposed on the TFT array substrate of the liquid crystal display, and the source electrode of the photo TFT is electrically connected to the drain electrode of the switch TFT. In yet another embodiment, the gate electrode of the photo TFT is electrically connected to a common line disposed on the TFT array substrate of the liquid crystal display, the drain electrode of the photo TFT is electrically connected to the switch line, and the source electrode of the photo TFT is electrically connected to the drain electrode of the switch TFT.

The photo TFT and the switch TFT are preferably amorphous silicon transistors. The switch line is preferably a gate line disposed on the TFT array substrate of the liquid crystal display.

Another aspect of the present invention is to provide a readout pixel for a liquid crystal display. The readout pixel includes a pixel thin film transistor (pixel TFT) and a photo-sensitive element. The gate electrode of the pixel TFT is electrically connected to one of gate lines disposed on a thin film transistor array substrate of the liquid crystal display and the photo-sensitive element further includes the foregoing switch thin film transistor (switch TFT) and the foregoing photo detecting device. The gate electrode of the switch TFT is electrically connected to one of the gate lines disposed on the thin film transistor array substrate and the source electrode of the switch TFT is electrically connected to a readout line. The photo detecting device is connected between the second gate line and the drain electrode of the switch TFT for detecting the brightness of a light incident thereon. In addition, the pixel TFT is also preferably an amorphous silicon transistor.

Further another aspect of the present invention is to provide a liquid crystal display. The liquid crystal display includes a color filter substrate (CF substrate), a thin film transistor array substrate (TFT substrate), and a layer of liquid crystal sandwiched between the CF substrate and the TFT substrate. In addition, a plurality of gate lines, data lines readout lines and readout pixels are disposed on the TFT substrate. Each readout pixel further includes the foregoing pixel TFT and the foregoing photo-sensitive element. The photo TFT, the switch TFT, and the pixel TFT are all preferably amorphous silicon transistors. In addition, the liquid crystal display may further include a readout pixel storage capacitor provided between an electrode of the pixel TFT and the readout line for the readout pixel while a normal pixel storage capacitor is provided between an electrode of a pixel TFT of the normal pixel and one of the gate lines adjacent to the normal pixel.

Because the amorphous silicon transistors are sensitive to light incident thereon, the photo TFT according to the present invention can be used as a basis upon which to detect the brightness of light incident thereon. In addition, the photo TFT can also be replaced by a photo diode which is sensitive to light incident thereon and connected between the switch TFT and the readout line. Alternatively, the photo TFT can also be replaced by a light sensitive resistor which is also sensitive to light incident thereon and connected between the switch TFT and the readout line. Therefore, the photo detecting device, such as the photo TFT, the photo diode or the light sensitive resistor, can control the current therethrough so that the light difference thereon can be measured in the liquid crystal display with readout pixels according to the present invention.

Accordingly, the photo-sensitive element according to the present invention can only be connected between the readout line and the switch line to effectively reduce the complexity of the electrical circuit of the photo-sensitive element, and effectively enhance the current difference thereof for easily detecting the light incident thereon and also enhance the aperture ratio of the liquid crystal display with readout pixels. The photo-sensitive element can also use the switch line to impose a higher voltage on the gate electrode or the drain electrode of the photo TFT to increase the current difference thereof to effectively measure the light incident thereon.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 2:
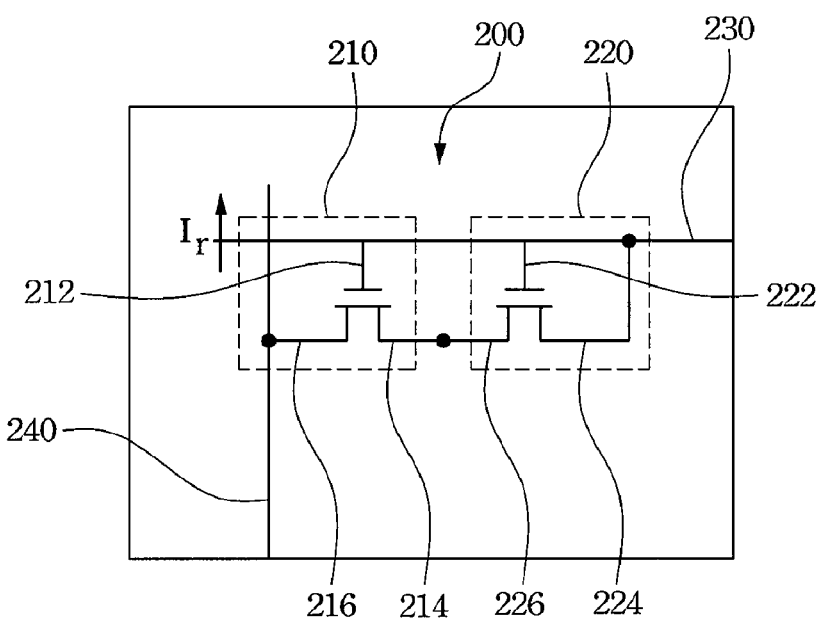
FIG. 2 illustrates a first embodiment according to the present invention.

FIG. 2 illustrates a first embodiment of a photo-sensitive element according to the present invention. The photo-sensitive element 200 includes a switch TFT 210 and a photo TFT 220, each of the two TFTs has a gate electrode and two terminal electrodes (source/drain electrodes) and the two TFTs are coupled between two conductive line, the switch line 230 and the readout line 240 The gate electrode 212 of the switch TFT 210 is connected to the switch line 230, and the gate electrode 222 and the drain electrode 224 of the photo TFT 220 are also connected to the switch line 230. The drain electrode 214 of the switch TFT 210 is connected to the source electrode 226 of the photo TFT 220. In addition, the source electrode 216 of the switch TFT 210 is connected to the readout line 240. The photo-sensitive element 200 is preferably a current type photo-sensitive element.

Figure 1A:
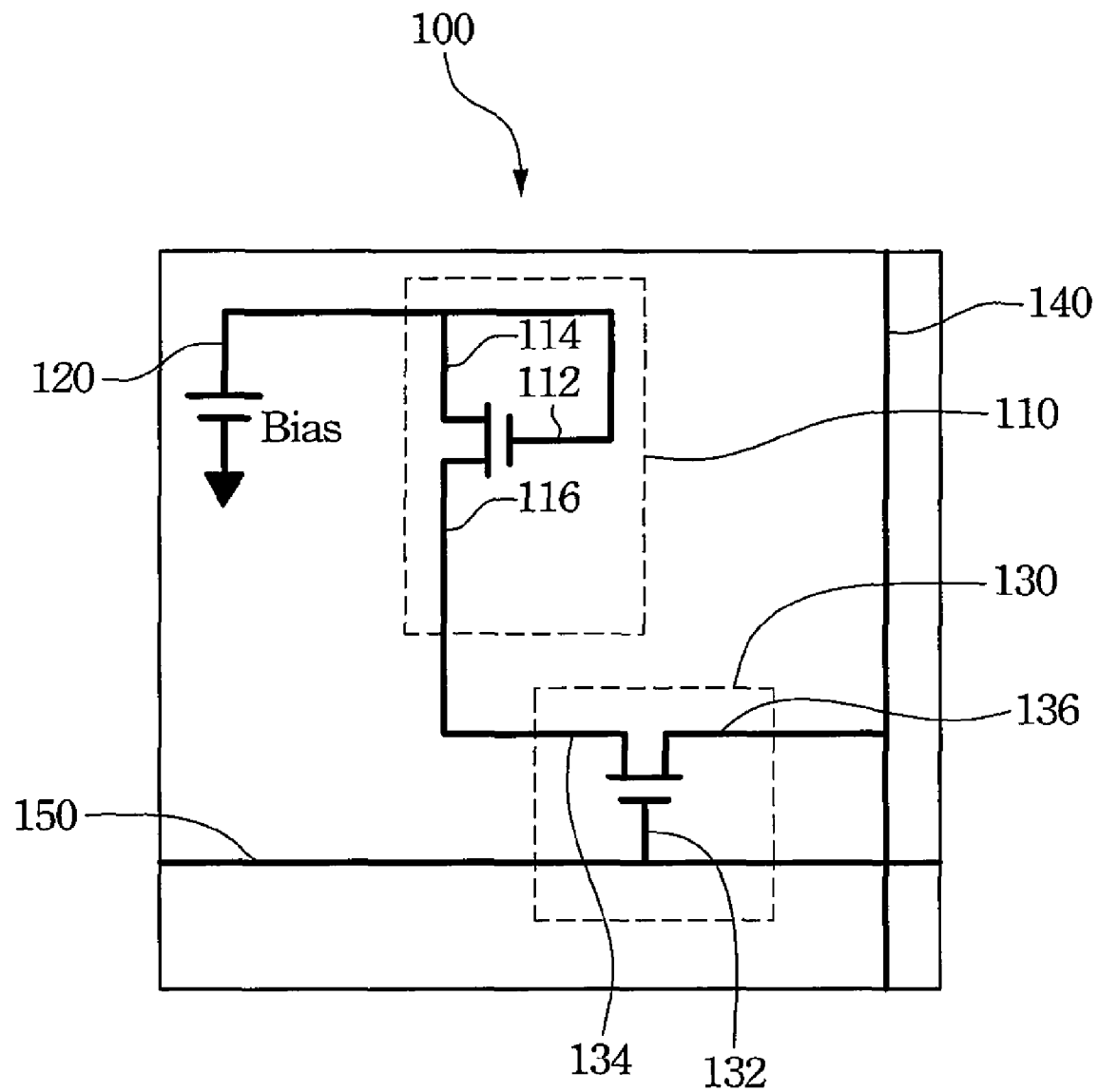
FIG. 1A illustrates a conventional current type photo-sensitive element for a liquid crystal display.
Figure 1B:
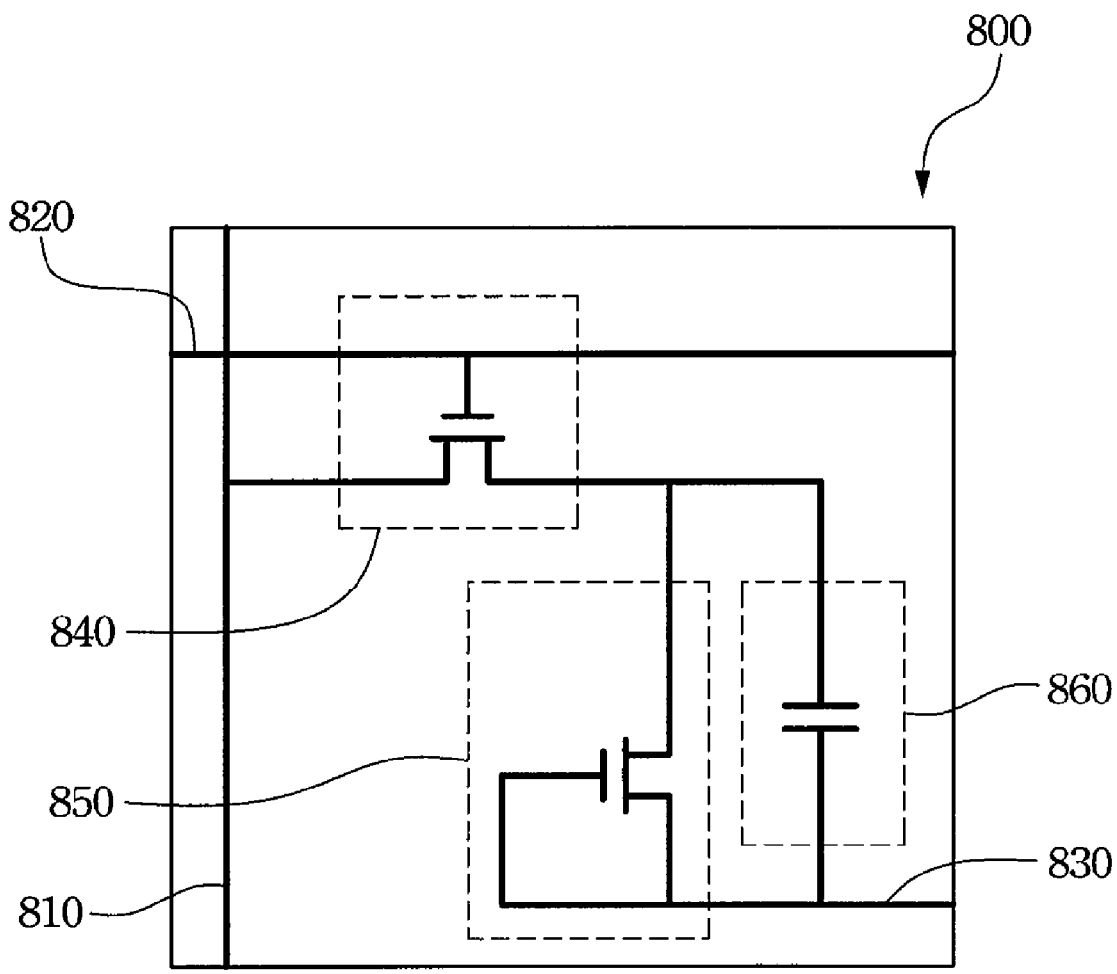
FIG. 1B illustrates a conventional charge type photo-sensitive element for a liquid crystal display.

Comparing the photo-sensitive element 200 with the conventional photo-sensitive element 100 of FIG. 1A, the photo-sensitive element 200 has no a bias voltage line any more through incorporating the bias voltage line with the switch line 230, thus the photo-sensitive element 200 does not have to be connected to a bias voltage line so that the quantity of the metal line in the TFT array substrate is reduced. Therefore, the photo-sensitive element 200 has to connect only the switch line 230 and the readout line 240. Therefore, the bias voltage line is not necessary in the TFT array substrate. Particularly, only two metal lines have to be connected with the photo-sensitive element 200 according to the present invention.

TABLE 1

The data of photo current

| W/L = 48/5 | $V_D = V_G = 5\,V$ | $V_D = V_G = 10\,V$ | $V_D = V_G = 15\,V$ |
|---|---|---|---|
| Dark | 2.34E−08 | 9.38E−07 | 3.6E−06 |
| Bright | 3.98E−07 | 2.43E−06 | 6.6E−06 |
| $I_{bright} - I_{dark}$ | 3.75E−07 | 1.49E−06 | 3.01E−06 |

Unit: A
where $V_D$ is the voltage of the drain electrode of the photo TFT and $V_G$ is the voltage of the gate electrode of the photo TFT, and the bright environmental condition is under about 2150 cd/m² and the dark environmental condition is in a black box isolated from any light source.

In addition, table 1 shows the measured data of the photo current of the photo-sensitive element 200. The data of the photo current in bright environmental conditions is measured at about 2150 cd/m² and the data of the photo current in dark environmental conditions is measured in a black box isolated from any light source. Referring to table 1, the photo current difference increases when the $V_G$ and the $V_D$ increases. Since the gate electrode 222 and the drain electrode 224 of the photo TFT 222 are both connected to the switch line 230, the switch line 230 can provide higher voltage for the photo TFT 220 compared to the bias voltage of the conventional photo-sensitive element 100. Accordingly, the photo current difference of the present invention between the dark environmental conditions and the bright environmental condition is larger than that of the conventional photo-sensitive element 100.

Figure 3:
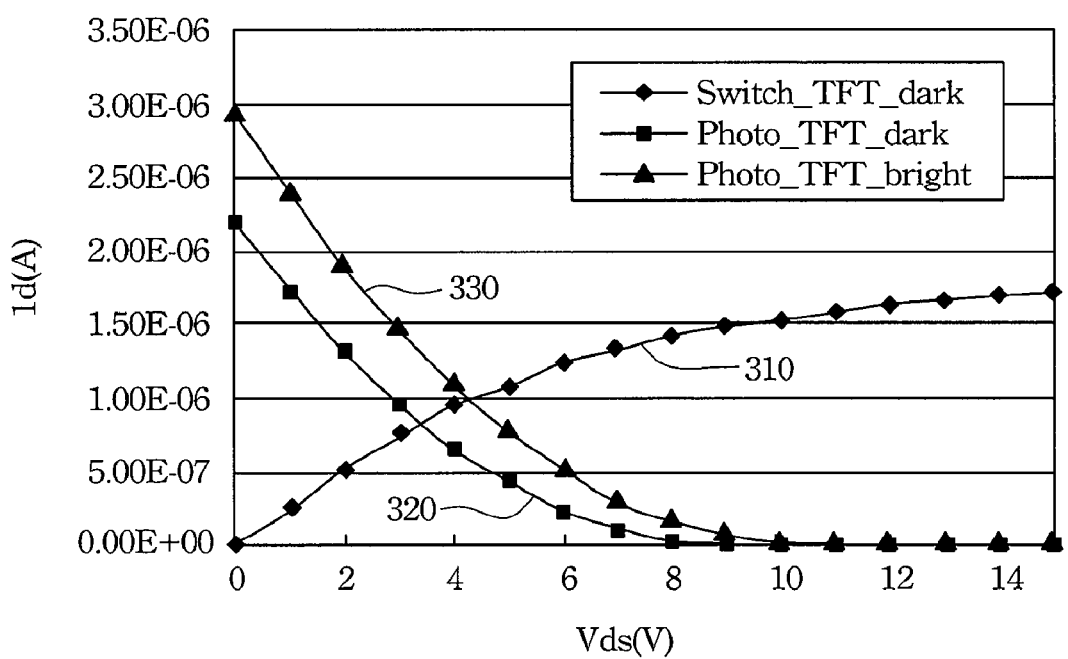
FIG. 3 illustrates the measured data curve of the first embodiment of FIG. 2 at different environmental conditions.

Referring to FIG. 3, the measured data curve of the first embodiment of FIG. 2 at different environmental conditions is provided. The vertical axis indicates the photo current and the horizontal axis indicates the voltage difference between the source electrode and the drain electrode of the switch TFT. The curve 310 is a drain current curve of the switch TFT measured in dark environmental conditions. The curve 320 is a load curve of the photo TFT measured in dark environmental conditions. In addition, the curve 330 is a load curve of the photo TFT measured in bright environmental conditions. The data of FIG. 3 is then summarized to table 2. Table 2 is the current data of the photo TFT and the Photo TFT+Switch TFT of the photo-sensitive element 200 according to the present invention.

TABLE 2

The current data of photo TFT and Photo TFT + Switch TFT

| W/L = 48/5 | Photo TFT | Photo TFT + Switch TFT |
|---|---|---|
| Dark | 2.17E−06 | 8.28E−07 |
| Bright | 2.93E−06 | 9.85E−07 |
| $I_{bright} - I_{dark}$ | 7.64E−07 | 1.57E−07 |

Unit: A
where the bright environmental condition is under about 2150 cd/m2 and the dark environmental condition is in a black box isolated from any light source.

In addition, table 3 is the current data of the photo TFT and the Photo TFT+Switch TFT of the conventional photo-sensitive element 100.

TABLE 3

The current data of photo TFT and Photo TFT + Switch TFT of the conventional photo-sensitive element

| | Photo TFT | Photo TFT + Switch TFT |
|---|---|---|
| Dark | 1.12E−09 | 1.10E−09 |
| Bright | 2.56E−08 | 2.41E−08 |
| $I_{bright} - I_{dark}$ | 2.45E−08 | 2.30E−08 |

Unit: A
where the bright environmental condition is under about 2150 cd/m² and the dark environmental condition is in a black box isolated from any light source.

Comparing table 2 with table 3, the current difference between the bright and the dark environmental, $I_{bright} - I_{dark}$, of the present invention is larger than that of the conventional photo-sensitive element about one order. Accordingly, the current difference of the photo-sensitive element 200 can be easily detected by a readout circuit that is connected to the readout line 240.

In addition, the photo element can be configured in every normal pixel or in some normal pixels to form the readout pixels so as to enable the TFT panel to have touch-read function also known as In-cell touch panel. The quantity of the photo elements configured in the TFT panel is dependent on the requested resolution of the touch-read function for the In-cell touch panel.

Figure 4A:
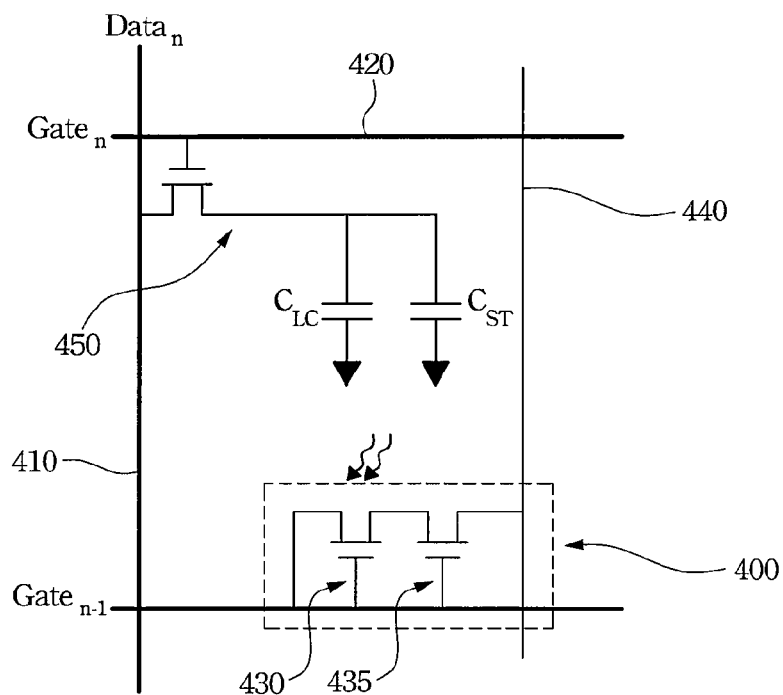
FIG. 4A illustrates one readout pixel with the first embodiment of FIG. 2 according to the present invention.

Furthermore, FIG. 4A illustrates one readout pixel disposed on a thin film transistor array substrate (TFT substrate) of a liquid crystal display with the first embodiment of FIG. 2 according to the present invention. Usually, the TFT substrate comprises a plurality of gate lines and data lines disposed thereon and the gate lines and the data lines together to define a plurality of pixels, however, for explanation simply, FIG. 4A only shows a readout pixel which is respectively coupled to a gate line 420 and a data line 410, but not shows the normal pixels at the same time. The readout pixel includes a pixel TFT 450 and a photo-sensitive element 400. The pixel TFT 450 is used as the switching element to charge the pixel in the liquid crystal display. The drain electrode and the gate electrode of the pixel TFT of the liquid crystal display are connected to data line 410 and the gate line 420 respectively. Furthermore, the photo-sensitive element 400 includes a photo TFT 430 and a switch TFT 435 connected only between the gate line 420 and the readout line 440. It is not necessary to lay out an additional bias line in order to supply voltage to the photo TFT 430 and the switch TFT 435 for driving photo current. Therefore, the aperture ratio of the liquid crystal display with readout pixels according to the present invention is increased. In addition, the photo current difference of the present invention can be easily detected by the readout circuit since the photo current difference is larger than that of the conventional photo-sensitive element so that the size of the photo-sensitive element can be reduced. Furthermore, the number of photo TFTs connected to each other for increasing the photo sensitivity is also reduced.

Figure 4B:
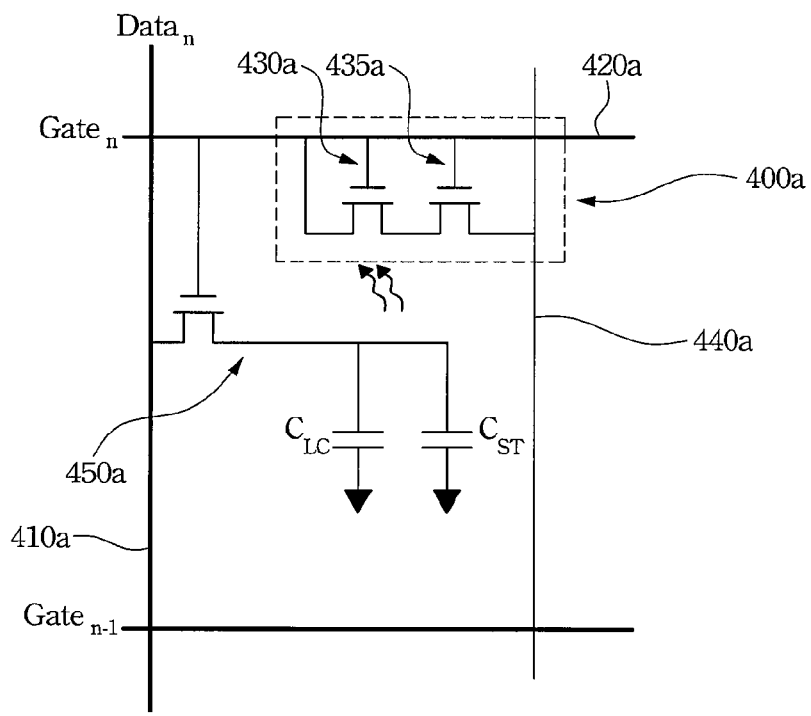
FIG. 4B illustrates another readout pixel with the first embodiment of FIG. 2 according to the present invention.

FIG. 4B illustrates another readout pixel disposed on a thin film transistor array substrate of a liquid crystal display with the first embodiment of FIG. 2 according to the present invention. The readout pixel of FIG. 4B similar to the readout pixel of FIG. 4A. includes a pixel TFT 450a and a photo-sensitive element 400a. However, the photo-sensitive element 400a is connected between the gate line 420a, the same gate line connected to the gate electrode of the pixel TFT 450a, and the readout line 440. Accordingly, the pixel TFT and a photo-sensitive element can be connected to the same gate line or a different gate line.

Figure 5A:
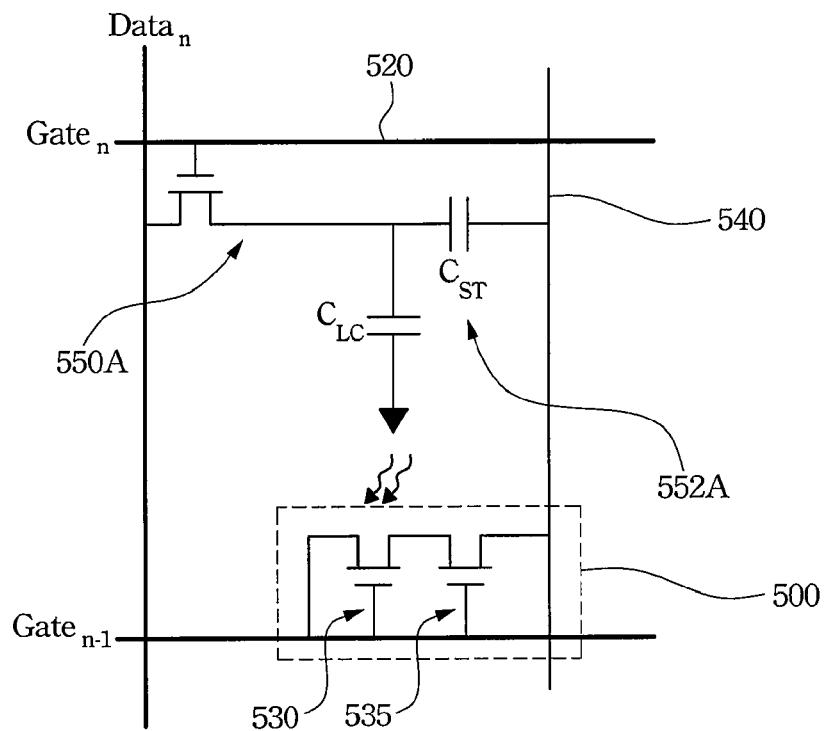
FIG. 5A illustrates another readout pixel with the first embodiment of a liquid crystal display according to the present invention.
Figure 5B:
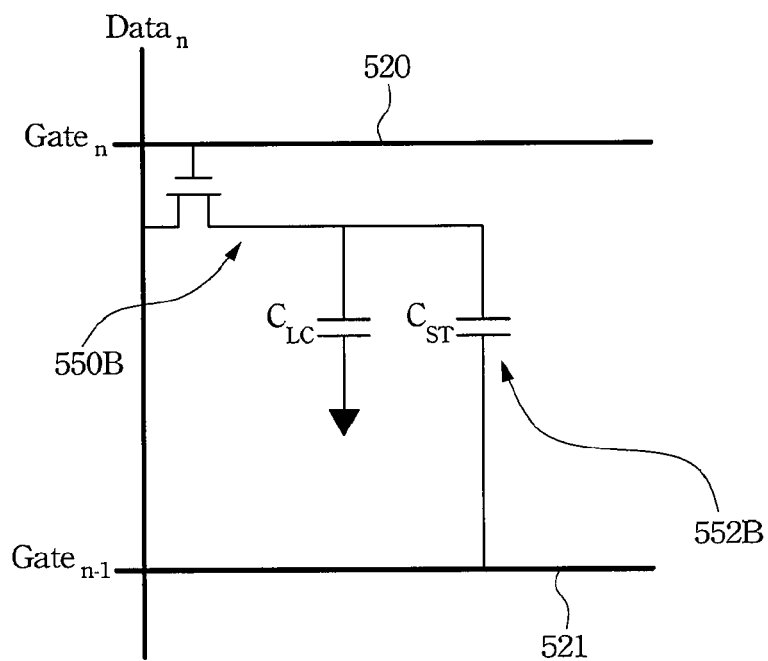
FIG. 5B illustrates a normal pixel of the liquid crystal display according to the present invention.

FIG. 5A illustrates another layout of a readout pixel based on the first embodiment of a liquid crystal display according to the present invention. In the present invention, there are two kind pixels in the liquid crystal display which has the touch-read function, one is the readout pixel with a photo element and the other is the normal pixel without the photo element. FIG. 5B illustrates a normal pixel without a photo element of the liquid crystal display according to the present invention. The conventional photo-sensitive elements normally utilize the common line as the bias line to provide the voltage to the photo TFT. However, between the readout line and the source electrode of the pixel TFT, a capacitance Cps is generated (not shown). Therefore, the storage capacitor Cst of the normal pixel has to be increased to compensate for the effect of the additional Cps in the readout pixel. Consequently, the aperture ratio of the liquid crystal display with the photo-sensitive elements is limited.

In the first embodiment of the liquid crystal display with readout pixels according to the present invention, the storage capacitor (Cst) 552A of the readout pixel can be provided between the source electrode of the pixel TFT 550A and the readout line 540, also referred to as Cst on readout line. Furthermore, the storage capacitor (Cst) 552B of the normal pixel can be provided between the source electrode of the pixel TFT 550B and the gate line 521, also referred to as Cst on gate. Therefore, the liquid crystal display with readout pixels according to the present invention can effectively remove the common line from the TFT array substrate. The aperture ratio of the liquid crystal display with readout pixels according to the present invention is effectively increased.

Figure 6:
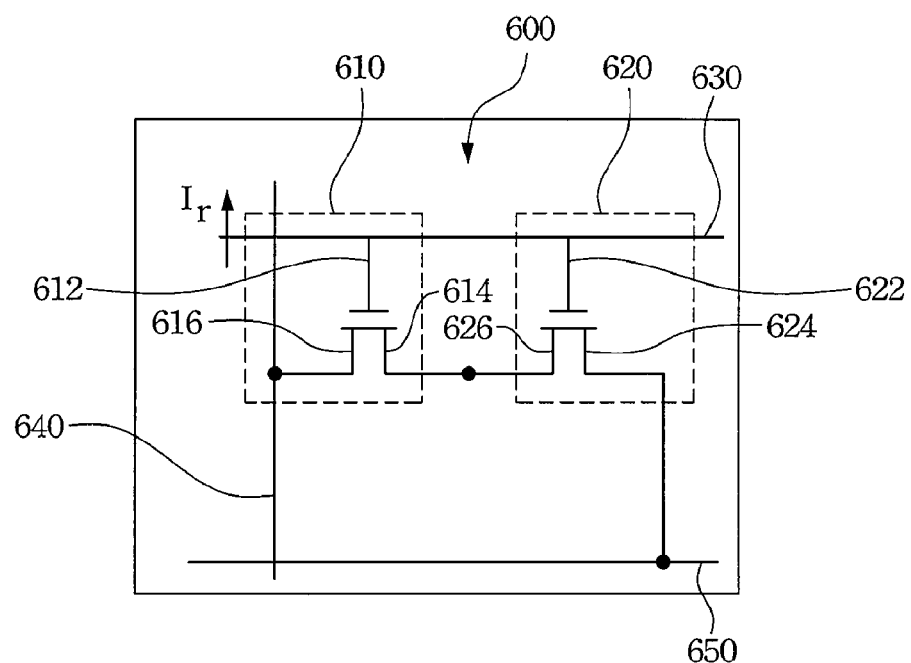
FIG. 6 illustrates a second embodiment of a photo-sensitive elements according to the present invention.

FIG. 6 illustrates a second embodiment of a photo-sensitive element according to the present invention. The photo-sensitive element 600 includes a switch TFT 610 and a photo TFT 620. The source electrode 616 of the switch TFT 610 is connected to the readout line 640 and the gate electrode 612 of the switch TFT 610 is connected to the switch line 630. The drain electrode 614 of the switch TFT 610 is connected to the source electrode 626 of the photo TFT 620. The gate electrode 622 of the photo TFT 620 is connected to the switch line 630 and the drain electrode 624 of the photo TFT is connected to a conductive line 650. While the photo-sensitive element 600 is utilized in some or all of the pixels of a liquid crystal display, the switch line 630 can be corresponding to the gate line of the liquid crystal display and the conductive line 650 can be corresponding to the common line of the liquid crystal display. Table 4 is the current data of the photo TFT.

TABLE 4

The current data of photo TFT

| W/L = 48/5; $V_D$ = 5 V | $V_G$ = 5 V | $V_G$ = 10 V | $V_G$ = 15 V |
| --- | --- | --- | --- |
| Dark | 2.34E−08 | 7.88E−07 | 2.31E−06 |
| Bright | 3.98E−07 | 1.85E−06 | 3.71E−06 |
| $I_{bright} - I_{dark}$ | 3.75E−07 | 1.07E−06 | 1.4E−06 |

Unit: A
where $V_D$ is the voltage of the drain electrode of the photo TFT and $V_G$ is the voltage of the gate electrode of the photo TFT, and the bright environmental condition is under about 2150 cd/m² and the dark environmental condition is in a black box isolated from any light source.

The current difference, $I_{bright} - I_{dark}$, is enhanced because the gate electrode 622 of photo TFT 620 is connected to the switch line 630 which $V_G$ is usually provided with higher voltage as compared to that of the conventional photo-sensitive element 100 in a liquid crystal display for driving on the photo current. The current difference is large and easily detected by the readout circuit connected to the readout line 640.

Figure 7:
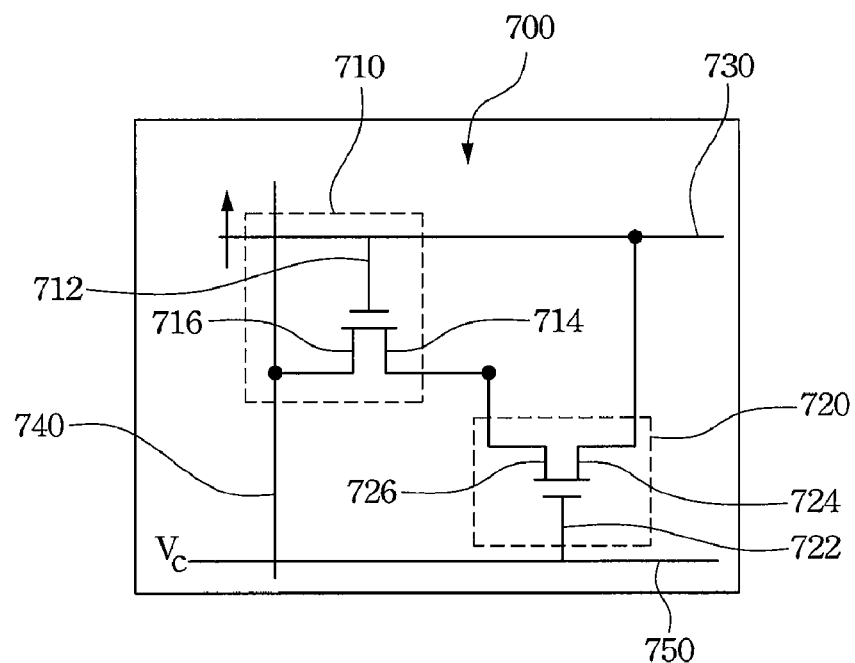
FIG. 7 illustrates a third embodiment of a photo-sensitive elements according to the present invention.

FIG. 7 illustrates a third embodiment of a photo-sensitive element according to the present invention. The photo-sensitive element 700 includes a switch TFT 710 and a photo TFT 720. The source electrode 716 of the switch TFT 710 is connected to the readout line 740 and the gate electrode 712 of the switch TFT 710 is connected to the switch line 730. The drain electrode 714 of the switch TFT 710 is connected to the source electrode 726 of the photo TFT 720. The gate electrode 722 of the photo TFT 720 is connected to a conductive line 750 and the drain electrode 724 of the photo TFT 720 is connected to the switch line 730. While the photo-sensitive element 700 is utilized in some or all of the pixels of a liquid crystal display, the switch line 730 can be corresponding to the gate line of the liquid crystal display and the conductive line 750 can be corresponding to the common line of the liquid crystal display. Table 5 is the current data of the photo TFT.

TABLE 5

The current data of photo TFT

| W/L = 48/5; $V_G$ = 5 | $V_D$ = 5 V | $V_D$ = 10 V | $V_D$ = 15 V |
| --- | --- | --- | --- |
| Dark | 2.34E−08 | 2.81E−08 | 3.26E−08 |
| Bright | 3.98E−07 | 4.72E−07 | 5.06E−07 |
| $I_{bright} - I_{dark}$ | 3.75E−07 | 4.44E−07 | 4.74E−07 |

Unit: A
where $V_D$ is the voltage of the drain electrode of the photo TFT and $V_G$ is the voltage of the gate electrode of the photo TFT, and the bright environmental condition is under about 2150 cd/m² and the dark environmental condition is in a black box isolated from any light source.

The current difference, $I_{bright} - I_{dark}$, is also enhanced because the drain electrode 724 of photo TFT 720 is connected to the switch line 730 which $V_G$ is provided higher voltage to the drain electrode 724 of photo TFT 720 as comparing to that of the conventional photo-sensitive element 100 for driving the photo current. The current difference is large and easily detected by a readout circuit connected with the readout line 740.

The pixel TFT, the switch TFT and the photo TFT according to the present invention are exemplarily constructed from amorphous silicon transistors. With the realization that amorphous silicon transistors are sensitive to light incident thereon, the photo TFT according to the present invention formed on the TFT array substrate may be used as a basis to detect the existence of or non-existence of ambient light incident thereon (e.g., relative values thereto). The photo TFT can also be replaced by a photo diode which is sensitive to light incident thereon and connected between the switch TFT and the switch line. That is, the photo-sensitive element may be constituted by a switch TFT and a photo diode. Alternatively, the photo TFT can also be replaced by a light sensitive resistor which is also sensitive to light incident thereon and connected between the switch TFT and the switch line. Therefore, the photo-sensitive element may also be constituted by a switch TFT and a light sensitive resistor. Accordingly, the photo-sensitive element can be constituted by a switch TFT and a photo detecting device, for example, a photo TFT, a photo diode or a light sensitive resistor, to control the current therethrough so that the light difference thereon can be detected in the liquid crystal display with readout pixels having the photo-sensitive element according to the present invention.

The photo-sensitive element according to the present invention can only be connected between the readout line and the switch line to effectively reduce the complexity of the electrical circuit of the photo-sensitive element, effectively enhance the current difference thereof to easily detect the light incident thereon, and effectively increase the aperture ratio of the liquid crystal display with readout pixels. The photo-sensitive element according to the present invention can also use the switch line to impose a higher voltage on the gate electrode or the drain electrode of the photo TFT to increase the current difference thereof for easily detecting the light incident thereon. Accordingly, the two terminal electrodes, the source electrodes and the drain electrodes of the switch TFT and the photo TFT, are interchangeable in the foregoing description and the following claim limitation.

As is understood by a person skilled in the art, the foregoing preferred embodiments of the present invention are illustrative of the present invention rather than limiting of the present invention. It is intended that various modifications and similar arrangements would be included within the spirit and scope of the appended claims, the scope of which should be accorded the broadest interpretation so as to encompass all such modifications and similar structures.

What is claimed is:

1. A photo-sensitive element, comprising:
   a first conductive line;
   a second conductive line;
   a switch thin film transistor (switch TFT) having a first gate electrode, a first terminal electrode and a second terminal electrode, wherein said first gate electrode is electrically connected to said first conductive line and said first terminal electrode is electrically connected to said second conductive line; and
   a photo thin film transistor (photo TFT) having a second gate electrode, a third terminal electrode and a fourth terminal electrode, wherein the photo TFT is electrically connected between said first conductive line and said second terminal electrode to detect a light incident thereon, the first gate electrode of the switch TFT and the second gate electrode of the photo TFT are connected to each other, and the second terminal electrode of the switch TFT and the third terminal electrode of the photo TFT are connected to each other.

2. The photo-sensitive element of claim 1, wherein said first conductive line and said second conductive line are respectively a switch line and a readout line of said switch TFT.

3. The photo-sensitive element of claim 1, wherein said first terminal electrode and said second terminal electrode are respectively source/drain electrodes of said switch TFT.

4. The photo-sensitive element of claim 1, wherein said third terminal electrode and said fourth terminal electrode are respectively source/drain electrodes of said photo TFT.

5. The photo-sensitive element of claim 1, wherein said photo TFT is disposed on a substrate.

6. The photo-sensitive element of claim 5, wherein said substrate is a TFT array substrate of a liquid crystal display.

7. The photo-sensitive element of claim 1, wherein said second gate electrode and said fourth terminal electrode are both electrically connected to said first conductive line.

8. The photo-sensitive element of claim 1, wherein said second gate electrode is electrically connected to said first conductive line, said fourth terminal electrode is electrically connected to a third conductive line, and said third terminal electrode is electrically connected to said second terminal electrode.

9. The photo-sensitive element of claim 1, wherein said second gate electrode is electrically connected to a third conductive line, said fourth terminal electrode is electrically connected to said first conductive line, and said third terminal electrode is electrically connected to said second terminal electrode.

10. The photo-sensitive element of claim 1, wherein said photo TFT is an amorphous silicon transistor.

11. The photo-sensitive element of claim 1, wherein said switch TFT is an amorphous silicon transistor.

12. A readout pixel for a liquid crystal display, comprising:
    a pixel thin film transistor (pixel TFT) disposed on a thin film transistor array substrate of said liquid crystal display;
    a photo-sensitive element disposed on said thin film transistor array substrate, wherein said photo-sensitive element further comprises:
    a first conductive line;
    a second conductive line;
    a switch thin film transistor (switch TFT) having a first gate electrode, a first terminal electrode and a second terminal electrode, wherein said first gate electrode is electrically connected to said first conductive line and said first terminal electrode is electrically connected to said second conductive line; and
    a photo thin film transistor (photo TFT) having a second gate electrode, a third terminal electrode and a fourth terminal electrode, wherein the photo TFT is electrically connected between said first conductive line and said second terminal electrode to detect a light incident thereon, the first gate electrode of the switch TFT and the second gate electrode of the photo TFT are connected to each other, and the second terminal electrode of the switch TFT and the third terminal electrode of the photo TFT are connected to each other.

13. The readout pixel of claim 12, wherein said pixel TFT has a third gate electrode electrically connected to a first gate line of said thin film transistor array substrate, and said first conductive line is a second gate line of said thin film transistor array substrate adjacent to said first gate line.

14. The readout pixel of claim 12, wherein said pixel TFT has a third gate electrode electrically connected to said first conductive line, and said first conductive line is a gate line of said thin film transistor array substrate.

15. The readout pixel of claim 12, wherein said second gate electrode and said fourth terminal electrode are both electrically connected to said first conductive line.

16. The readout pixel of claim 12, wherein said second gate electrode is electrically connected to said first conductive line, said fourth terminal electrode is electrically connected to a third conductive line, and said third terminal electrode is electrically connected to said second terminal electrode.

17. The readout pixel of claim 16, wherein said third conductive line is a common line of said thin film transistor array substrate.

18. The readout pixel of claim 12, wherein said second gate electrode is electrically connected to a third conductive line, said fourth terminal electrode is electrically connected to said first conductive line, and said third terminal electrode is electrically connected to said second terminal electrode.

19. The readout pixel of claim 18, wherein said third conductive line is a common line of said thin film transistor array substrate.

20. The readout pixel of claim 12, wherein said photo TFT is an amorphous silicon transistor.

21. The readout pixel of claim 12, wherein said switch TFT and said pixel TFT are amorphous silicon transistors.

* * * * *